United States Patent
Boes et al.

(10) Patent No.: US 9,874,452 B2
(45) Date of Patent: Jan. 23, 2018

(54) METHOD AND APPARATUS FOR ENHANCED DRIVING EXPERIENCE INCLUDING DYNAMIC POI IDENTIFICATION

(71) Applicant: Ford Global Technologies, LLC, Dearborn, MI (US)

(72) Inventors: Chad Christopher Boes, Plymouth, MI (US); Chad Evert Esselink, Canton, MI (US); Andrew E. Shaffer, Bloomfield Village, MI (US); Justin Counts, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 701 days.

(21) Appl. No.: 13/826,022

(22) Filed: Mar. 14, 2013

(65) Prior Publication Data

US 2014/0278090 A1   Sep. 18, 2014

(51) Int. Cl.
G01C 21/34 (2006.01)
G08G 1/123 (2006.01)
G01C 21/36 (2006.01)

(52) U.S. Cl.
CPC ..... *G01C 21/3476* (2013.01); *G01C 21/3679* (2013.01)

(58) Field of Classification Search
CPC .......................... G01C 21/3664; G01C 21/3688
USPC .......................................................... 701/533
See application file for complete search history.

(56) References Cited

U.S. PATENT DOCUMENTS

| | | |
|---|---|---|
| 4,937,751 A | 6/1990 | Nimura et al. |
| 5,177,685 A | 1/1993 | Davis et al. |
| 5,220,507 A | 6/1993 | Kirson |
| 5,275,474 A | 1/1994 | Chin et al. |
| 5,291,412 A | 3/1994 | Tamai et al. |
| 5,351,779 A | 10/1994 | Yamashita |
| 5,394,332 A | 2/1995 | Kuwahara et al. |
| 5,406,491 A | 4/1995 | Lima |

(Continued)

FOREIGN PATENT DOCUMENTS

| | | |
|---|---|---|
| CN | 1573296 | 2/2005 |
| DE | 102005029744 | 12/2006 |

(Continued)

OTHER PUBLICATIONS

International Searching Authority, International Search Report and the Written Opinion for the corresponding PCT Application No. PCT/US2009/69668 dated Mar. 4, 2010.

(Continued)

*Primary Examiner* — Maceeh Anwari
(74) *Attorney, Agent, or Firm* — Jennifer Stec; Brooks Kushman P.C.

(57) ABSTRACT

A system includes a processor configured to receive vehicle coordinates. The processor is also configured to compare the vehicle coordinates to geo-fence coordinate sets of a plurality of geo-fences surrounding point of interest (POI), wherein at least a portion of each geo-fence is within some predetermined distance from the vehicle coordinates. The processor is further configured to receive information relating to the POI if the vehicle coordinates fall within the geo-fence coordinates and instruct presentation of the received information to vehicle occupants.

20 Claims, 7 Drawing Sheets

(56) References Cited

U.S. PATENT DOCUMENTS

| | | |
|---|---|---|
| 5,406,492 A | 4/1995 | Suzuki |
| 5,487,002 A | 1/1996 | Diller et al. |
| 5,578,748 A | 11/1996 | Brehob et al. |
| 5,742,922 A | 4/1998 | Kim |
| 5,767,795 A | 6/1998 | Schaphorst |
| 5,790,973 A | 8/1998 | Blaker et al. |
| 5,802,492 A | 9/1998 | DeLorme et al. |
| 5,848,364 A | 12/1998 | Ohashi |
| 5,901,806 A | 5/1999 | Takahashi |
| 6,005,494 A | 12/1999 | Schramm |
| 6,028,537 A | 2/2000 | Suman et al. |
| 6,101,443 A | 8/2000 | Kato et al. |
| 6,314,369 B1 | 11/2001 | Ito et al. |
| 6,374,177 B1 | 4/2002 | Lee et al. |
| 6,401,034 B1 | 6/2002 | Kaplan et al. |
| 6,424,363 B1 | 7/2002 | Matsuba et al. |
| 6,424,888 B1 | 7/2002 | Sone et al. |
| 6,427,115 B1 | 7/2002 | Sekiyama |
| 6,427,117 B1 | 7/2002 | Ito et al. |
| 6,462,676 B1 | 10/2002 | Koizumi |
| 6,484,092 B2 | 11/2002 | Seibel |
| 6,484,093 B1 | 11/2002 | Ito et al. |
| 6,487,477 B1 | 11/2002 | Woestman et al. |
| 6,532,372 B1 | 3/2003 | Hwang |
| 6,533,367 B1 | 3/2003 | Latamik et al. |
| 6,574,538 B2 | 6/2003 | Sasaki |
| 6,574,551 B1 | 6/2003 | Maxwell et al. |
| 6,608,887 B1 | 8/2003 | Reksten et al. |
| 6,691,025 B2 | 2/2004 | Reimer |
| 6,791,471 B2 | 9/2004 | Wehner et al. |
| 6,829,529 B2 | 12/2004 | Trefzer et al. |
| 6,834,229 B2 | 12/2004 | Rafiah et al. |
| 6,866,349 B2 | 3/2005 | Sauter et al. |
| 6,904,362 B2 | 6/2005 | Nakashima et al. |
| 6,999,779 B1 | 2/2006 | Hashimoto |
| 7,053,866 B1 | 5/2006 | Mimran |
| 7,082,443 B1 | 7/2006 | Ashby |
| 7,089,110 B2 | 8/2006 | Pechatnikov et al. |
| 7,113,107 B2 | 9/2006 | Taylor |
| 7,167,799 B1 | 1/2007 | Dolgov et al. |
| 7,243,134 B2 | 7/2007 | Bruner et al. |
| 7,286,931 B2 | 10/2007 | Kawasaki |
| 7,315,259 B2 | 1/2008 | Sacks |
| 7,369,938 B2 | 5/2008 | Scholl |
| 7,421,334 B2 | 9/2008 | Dahlgren et al. |
| 7,486,199 B2 | 2/2009 | Tengler et al. |
| 7,571,042 B2 | 8/2009 | Taylor et al. |
| 7,626,490 B2 | 12/2009 | Kashima |
| 7,642,901 B2 | 1/2010 | Kato et al. |
| 7,653,481 B2 | 1/2010 | Tramel |
| 7,706,796 B2 | 4/2010 | Rimoni et al. |
| 7,726,360 B2 | 6/2010 | Sato et al. |
| 7,804,423 B2 | 9/2010 | Mudalige et al. |
| 7,818,380 B2 | 10/2010 | Tamura et al. |
| 7,822,380 B2 | 10/2010 | Wu |
| 7,822,546 B2 | 10/2010 | Lee |
| 7,826,945 B2 | 11/2010 | Zhang et al. |
| 7,894,592 B2 | 2/2011 | Book et al. |
| 7,920,969 B2 | 4/2011 | Mudalige et al. |
| 8,121,802 B2 | 2/2012 | Grider et al. |
| 8,145,376 B2 | 3/2012 | Sherony |
| 8,290,704 B2 | 10/2012 | Bai |
| 2001/0001847 A1 | 5/2001 | Hessing |
| 2002/0087262 A1 | 7/2002 | Bullock et al. |
| 2002/0152018 A1 | 10/2002 | Duckeck |
| 2003/0028320 A1 | 2/2003 | Niitsuma |
| 2003/0036848 A1 | 2/2003 | Sheha et al. |
| 2003/0040866 A1 | 2/2003 | Kawakami |
| 2003/0040868 A1 | 2/2003 | Fish et al. |
| 2003/0158652 A1 | 8/2003 | Friedrichs et al. |
| 2004/0021583 A1 | 2/2004 | Lau et al. |
| 2004/0117108 A1 | 6/2004 | Nemeth |
| 2004/0117113 A1 | 6/2004 | Friedrichs et al. |
| 2005/0085956 A1 | 4/2005 | Losey |
| 2005/0144573 A1 | 6/2005 | Moody et al. |
| 2005/0159881 A1 | 7/2005 | Furukawa |
| 2006/0025923 A1 | 2/2006 | Dotan et al. |
| 2006/0026335 A1 | 2/2006 | Hodgson et al. |
| 2006/0069504 A1 | 3/2006 | Bradley et al. |
| 2006/0089788 A1 | 4/2006 | Laverty |
| 2006/0145837 A1 | 7/2006 | Horton et al. |
| 2006/0168627 A1 | 7/2006 | Zeinstra et al. |
| 2006/0172745 A1 | 8/2006 | Knowles |
| 2006/0184314 A1 | 8/2006 | Couckuyt et al. |
| 2006/0190164 A1 | 8/2006 | Glaza |
| 2006/0241857 A1 | 10/2006 | Onishi et al. |
| 2006/0282214 A1 | 12/2006 | Wolterman |
| 2007/0005241 A1 | 1/2007 | Sumizawa et al. |
| 2007/0038362 A1 | 2/2007 | Gueziec |
| 2007/0050248 A1 | 3/2007 | Huang et al. |
| 2007/0093955 A1 | 4/2007 | Hughes |
| 2007/0104224 A1 | 5/2007 | Conner et al. |
| 2007/0143013 A1 | 6/2007 | Breen |
| 2007/0143482 A1 | 6/2007 | Zancho |
| 2007/0143798 A1 | 6/2007 | Jira et al. |
| 2007/0198172 A1 | 8/2007 | Sumizawa et al. |
| 2007/0203643 A1 | 8/2007 | Ramaswamy et al. |
| 2007/0203646 A1 | 8/2007 | Diaz et al. |
| 2007/0213092 A1 | 9/2007 | Geelen |
| 2007/0219706 A1 | 9/2007 | Sheynblat |
| 2007/0273624 A1 | 11/2007 | Geelen |
| 2007/0290839 A1 | 12/2007 | Uyeki et al. |
| 2008/0005734 A1 | 1/2008 | Poristoin et al. |
| 2008/0065318 A1 | 3/2008 | Ho |
| 2008/0082260 A1 | 4/2008 | Kimura |
| 2008/0114534 A1 | 5/2008 | Yamazaki et al. |
| 2008/0147305 A1 | 6/2008 | Kawamata et al. |
| 2008/0147308 A1 | 6/2008 | Howard et al. |
| 2008/0162034 A1* | 7/2008 | Breen ......................... 701/202 |
| 2008/0195305 A1 | 8/2008 | Jendbro et al. |
| 2008/0228346 A1 | 9/2008 | Lucas et al. |
| 2008/0303693 A1 | 12/2008 | Link, II |
| 2009/0055091 A1 | 2/2009 | Hines et al. |
| 2009/0063042 A1 | 3/2009 | Santesson et al. |
| 2009/0083627 A1 | 3/2009 | Onda et al. |
| 2009/0143934 A1 | 6/2009 | Motonaga et al. |
| 2009/0177384 A1 | 7/2009 | Walder |
| 2009/0186596 A1 | 7/2009 | Kaltsukis |
| 2009/0192688 A1 | 7/2009 | Padmanabhan et al. |
| 2009/0196294 A1 | 8/2009 | Black et al. |
| 2009/0216434 A1 | 8/2009 | Panganiban et al. |
| 2009/0228172 A1 | 9/2009 | Markyvech et al. |
| 2009/0254266 A1 | 10/2009 | Altrichter et al. |
| 2009/0259354 A1 | 10/2009 | Krupadanam et al. |
| 2009/0326797 A1 | 12/2009 | Tengler et al. |
| 2009/0326801 A1 | 12/2009 | Johnson et al. |
| 2010/0010732 A1 | 1/2010 | Hartman |
| 2010/0048184 A1 | 2/2010 | Kim |
| 2010/0088018 A1 | 4/2010 | Tsurutome et al. |
| 2010/0088029 A1 | 4/2010 | Hu et al. |
| 2010/0094500 A1 | 4/2010 | Jin |
| 2010/0094550 A1 | 4/2010 | Tsurutome et al. |
| 2010/0138151 A1 | 6/2010 | Jang et al. |
| 2010/0174485 A1 | 7/2010 | Taylor et al. |
| 2010/0191463 A1 | 7/2010 | Berry et al. |
| 2010/0198508 A1 | 8/2010 | Tang |
| 2010/0217482 A1 | 8/2010 | Vogel et al. |
| 2010/0241342 A1 | 9/2010 | Scalf et al. |
| 2010/0245123 A1 | 9/2010 | Prasad et al. |
| 2011/0003578 A1 | 1/2011 | Chen et al. |
| 2011/0004523 A1 | 1/2011 | Giuli et al. |
| 2011/0028118 A1 | 2/2011 | Thomas |
| 2011/0046883 A1 | 2/2011 | Ross et al. |
| 2011/0166774 A1 | 7/2011 | Schunder |
| 2011/0178811 A1 | 7/2011 | Sheridan |
| 2011/0221586 A1 | 9/2011 | Eikelenberg et al. |
| 2011/0238289 A1 | 9/2011 | Lehmann et al. |
| 2011/0246016 A1 | 10/2011 | Vang et al. |
| 2011/0255481 A1 | 10/2011 | Sumcad et al. |
| 2012/0004841 A1 | 1/2012 | Schunder |
| 2012/0029806 A1 | 2/2012 | Scalf et al. |
| 2012/0029807 A1 | 2/2012 | Schunder et al. |
| 2012/0041673 A1 | 2/2012 | Vandivier et al. |

(56) References Cited

U.S. PATENT DOCUMENTS

| | | |
|---|---|---|
| 2012/0053825 A1 | 3/2012 | Schunder |
| 2012/0173134 A1 | 7/2012 | Gutman |
| 2013/0030630 A1 | 1/2013 | Luke et al. |

FOREIGN PATENT DOCUMENTS

| | | |
|---|---|---|
| DE | 102010032229 | 1/2012 |
| EP | 1085299 | 3/2001 |
| JP | 2004021503 | 1/2004 |
| JP | 2005091193 | 4/2005 |
| JP | 20060337180 | 12/2006 |
| JP | 200964951 | 3/2007 |
| JP | 20080078696 | 4/2008 |
| JP | 20080162578 | 7/2008 |
| WO | 2008037471 | 4/2008 |

OTHER PUBLICATIONS

International Searching Authority, The International Search Report and the Written Opinion of the International Searching Authority for the corresponding International Application No. PCT/US2010/23887 dated Apr. 12, 2010.

Patent Cooperation Treaty, International Preliminary Examining Authority, International Preliminary Report on Patentability for the corresponding PCT/US10/23887 dated Apr. 29, 2011.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Findlater et al., Impact of Screen Size on Performance, Awareness, and User Satisfaction with Graphical User Interfaces, Association for Computing Machinery (ACM), Apr. 5-10, 2008, pp. 1247-1256, see Fig. 1.

Garmin Garage, Follow the Leader, www.garmin.com/garmin/cms/site/us.

TomTom, portable car navigation systems, http://www.tomtom.com, Feb. 6, 2009.

MapQuest Maps—Driving Directions—Map, http://www.mapquest.com, Aug. 25, 2009.

Multi-Modal Navigation Tools, TDM Encyclopedia, Jan. 26, 2010.

Google Maps Finally Adds Bike Routes, Mary Catherine O'Connor, Mar. 10, 2010, printed from www.wired.com/autopia/2010/03/google-maps-for-bikes/.

POI Along Route Qs, Printed from http://www.tomtomforums.com, printed Jul. 30, 2010.

Difficult POI search in Streets & Trips, printed from http://www.laptopgpsworld.com/3520-difficult-poi-search-streets-tips, printed Jul. 30, 2010.

http://www.rated4stars.com/html/gps-saves-gas.html.

http://www.gps.cx/index.php?c=1&n=493964&i=B001LTHONU&x=GPS_Buddy_FE01US_Fuel_Economy_Software_Package.

http://www.gpsmagaziine.com/2009/02/hands-on_with_garmins_new_ecor.php (Feb. 2009).

http://www.nrel.gov/vehiclesandfuels/vsa/pdfs/42557.pdf (Apr. 2008).

http://green.autoblog.com/2009/03/05/sentience-research-vehicle-shows-how-tons-of-data-can-save-milli/ (Mar. 2009).

http://reviews.cnet.com/8301-13746_7-10189749-48.html.

Navigator—A Talking GPS Receiver for the Blind, Ryszard Kowalik and Stanislaw Kwasniewski, Gdansk University of Technology, 2004.

Speech-Enabled Web Services for Mobile Devices, M. Hu, Z. Davis, S. Prasad, M. Schuricht, P.M. Melilar-Smith and L.E. Moser, Department of Electrical and Computer Engineering, University of California, Santa Barbara, CA 93106.

\* cited by examiner

METHOD AND APPARATUS FOR ENHANCED DRIVING EXPERIENCE INCLUDING DYNAMIC POI IDENTIFICATION

TECHNICAL FIELD

The illustrative embodiments generally relate to a method and apparatus for enhanced driving experience including dynamic point of interest (POI) identification.

BACKGROUND

Many vehicles now sold are provided with complex and powerful computing and communication systems provided thereto. Often including navigation, user interactivity and a variety of possible features, these systems can enhance and improve the driving experience. Through connections to cloud based processors and the wealth of information provided on the Internet and remote servers, these systems can draw on numerous remote resources to further upgrade the driving experience.

U.S. Pat. No. 8,290,704 generally relates to a system and method for collecting and conveying point of interest (POI) information is disclosed. The system detects when a vehicle is at a previously unknown POI, gathers information related to the new POI, and updates a central server with the new POI location information. In this context, a POI may be any type of location including roads, gas stations, strip malls, retail establishments, eating establishments, hospitals, police stations, etc. POI information may include a variety of data including new road locations, new entrances to roads, toll amounts, gas station names, gas prices, strip mall names, retail establishment names, eating establishment names, sales and specials, hospital names, emergency room entrance locations, police station entrances, etc.

U.S. Application Publication 2007/0219706 generally relates to methods, apparatus, and systems for determining the relevance of points of interest for a user are described. An application server receives information about a user's location, and velocity, as well as other user preferences, and adjusts a search space and filters points of interest identifying those that are relevant to the user. The relevance of the points of interest are based on the user's route, location and velocity.

U.S. Pat. No. 7,286,931 generally relates to a vehicle navigation device provided for permitting the display of the current POI (Point of Interest) information about points of interest which serve as landmarks near a guidance route to the destination, thereby improving visibility when a user identifies the guidance route. A vehicle navigation device is connected in communication with a provider for offering transmission service of map information which includes the current POI information pertaining to locations on a map where the points of interest are located. The navigation device includes a display unit, information input means, communications means, and control means. The control means accesses the provider through the communications means when the guidance route to the destination is set by the information input means, to obtain the current POI information about an area near the set guidance route from the map information, so that the obtained current POI information is displayed on a screen of the display unit, together with the guidance route and a vehicle position mark for designating a present position of a vehicle.

SUMMARY

In a first illustrative embodiment, a system includes a processor configured to receive vehicle coordinates. The processor is also configured to compare the vehicle coordinates to geo-fence coordinate sets of a plurality of geo-fences surrounding point of interest (POI), wherein at least a portion of each geo-fence is within some predetermined distance from the vehicle coordinates. The processor is further configured to receive information relating to the POI if the vehicle coordinates fall within the geo-fence coordinates and instruct presentation of the received information to vehicle occupants.

In a second illustrative embodiment, a computer-implemented includes receiving vehicle coordinates. The method also includes comparing the vehicle coordinates, via a computing system, to geo-fence coordinate sets of a plurality of geo-fences surrounding point of interest (POI), wherein at least a portion of each geo-fence is within some predetermined distance from the vehicle coordinates. The method further includes receiving information relating to the POI if the vehicle coordinates fall within the geo-fence coordinates and instructing presentation of the received information to vehicle occupants.

In a third illustrative embodiment, a non-transitory, computer readable storage medium, stores instructions that, when executed by a processor, cause the processor to perform a method including receiving vehicle coordinates. The method also includes comparing the vehicle coordinates, via a computing system, to geo-fence coordinate sets of a plurality of geo-fences surrounding point of interest (POI), wherein at least a portion of each geo-fence is within some predetermined distance from the vehicle coordinates. The method further includes receiving information relating to the POI if the vehicle coordinates fall within the geo-fence coordinates and instructing presentation of the received information to vehicle occupants.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
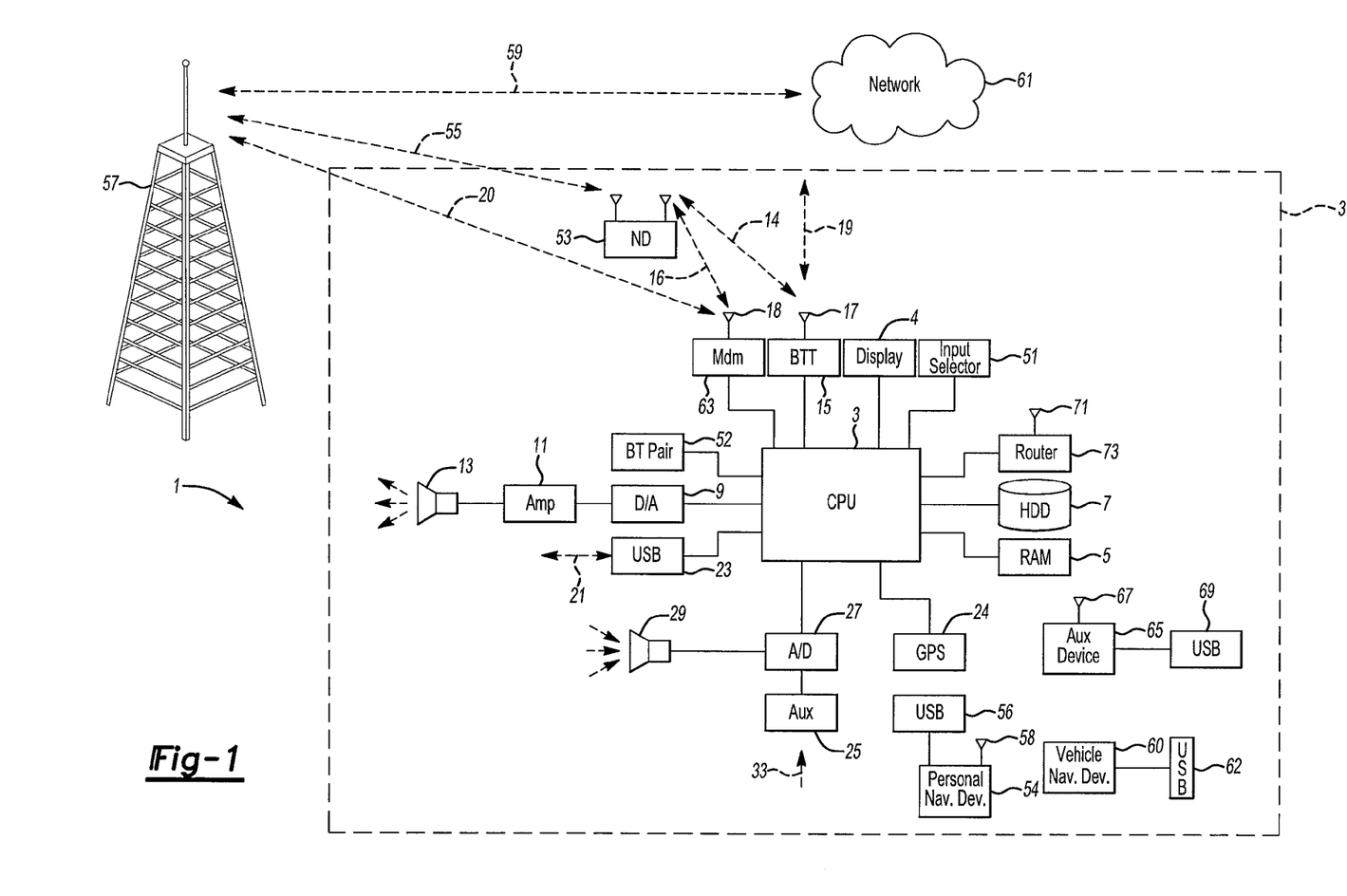
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection.

Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The illustrative embodiments provide an opportunity to identify relevant points of interest as a vehicle travels pass those points. The points can be traditional points of interest, or they can be added to a POI server with respect to a special event. In other words, they can have a temporal aspect added thereto. If a system contains or accesses such points of interest, the time at which the access is made may also be considered. If the time is past an "end time" or "end date," the POI may be ignored. In another example, the POI may also be removed from the database once it has expired.

Further, customers may be able to request downloads of new POIs at any point along a journey. Customers can enter a route and ask the vehicle which POIs will be "encountered" (as according to the illustrative embodiments, for example) along a route. Since the vehicle or cloud server can estimate arrival times based on known travel data, the vehicle could also attempt to "guess" at which time a vehicle will pass through POIs. This can be useful if the POIs are temporary.

Figure 2A:
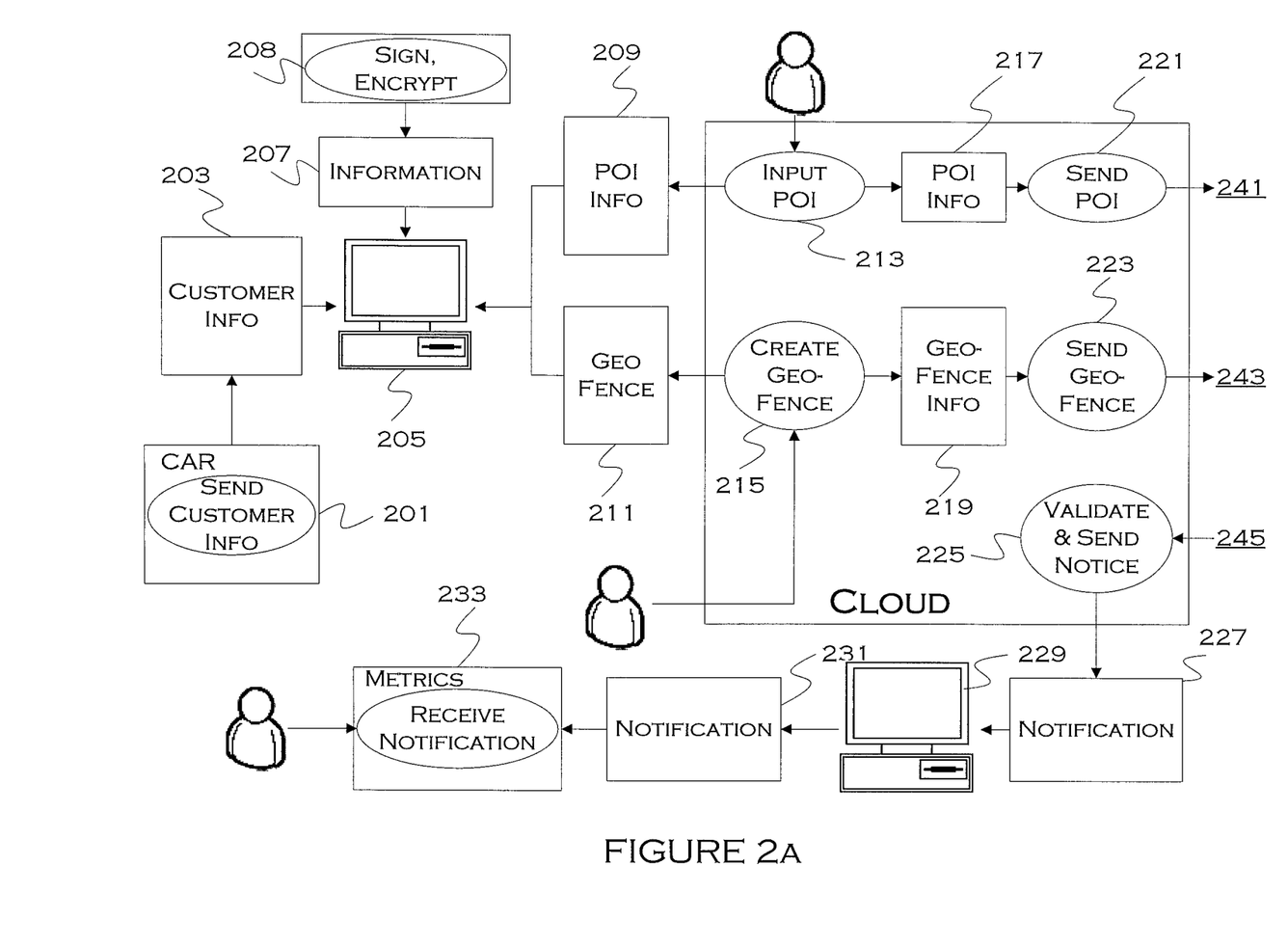
FIGS. 2A and 2B show an illustrative example of a point of interest (POI) determination and provision process.
Figure 2B:
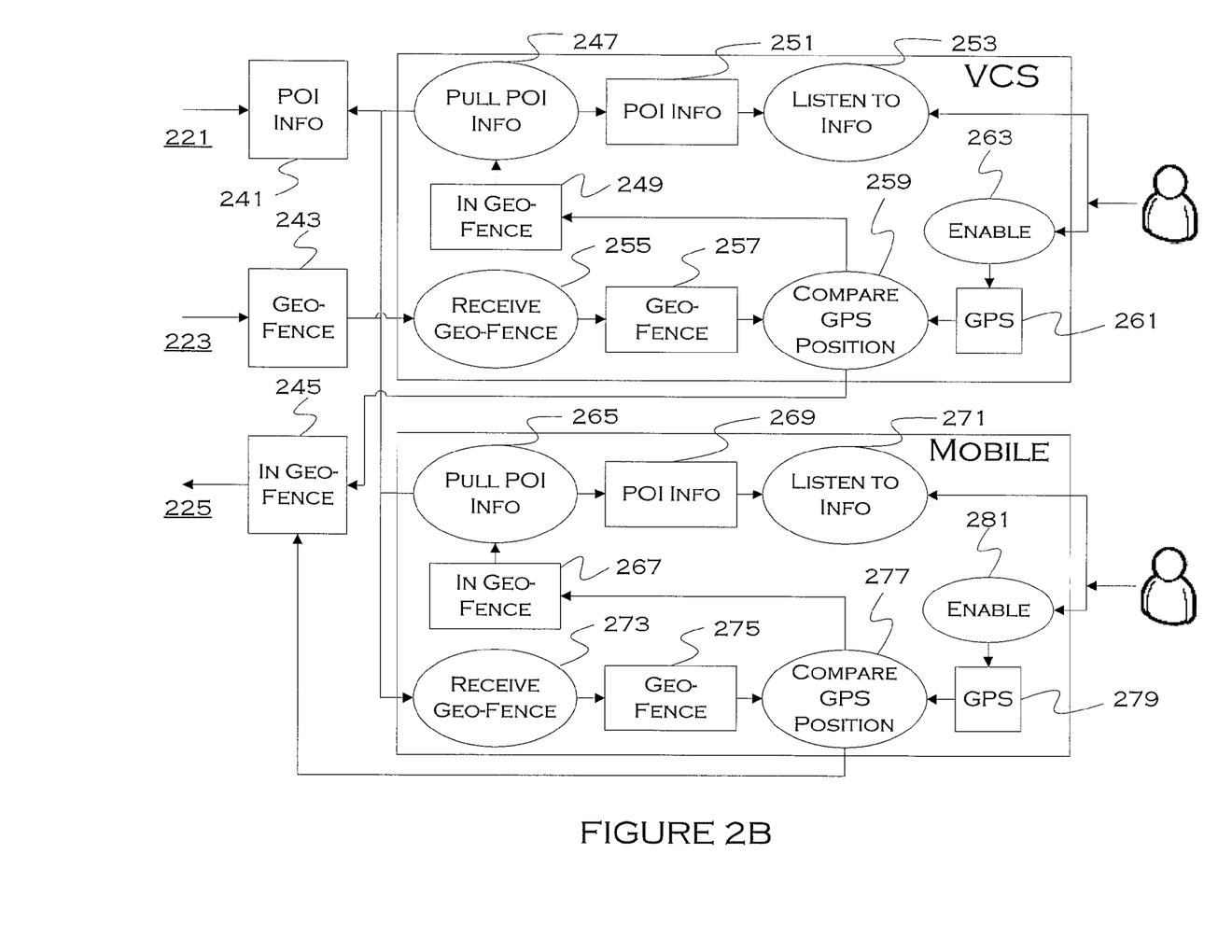

FIGS. 2A and 2B show an illustrative example of a point of interest (POI) determination and provision process. In FIG. 2A, customer information 203 is sent 201 to a remote server 205 for POI processing. This information can identify a customer's vehicle, route, location, subscriptions, eligibilities, etc. The information 207 can also be signed and encrypted 209 for further processing, so that the customer's location and personal information are secure.

In this illustrative example, POIs have geo-fences associated therewith. For larger POIs (such as a highly visible monument or building) these geo-fences can be expanded, so that a driver may not need to be in the immediate vicinity. For smaller POIs, a building of nominal size, a park, etc., these geo-fences may be smaller, such that they are only tripped by a vehicle passing in immediate proximity to the POI. Of course, suitable changes can be made as a provider sees fit.

POI information 207 and/or geo-fence information 211 can be compared to current customer information on a remote server to determine if any criteria for pre-loading POI information to a vehicle are met. For example, if a route has been delivered to the remote server, the process can compare the route to possible POIs and geo-fences for determination of suitable pre-loading of POI information relating to the route.

In this illustrative example, POI and geo-fence information, relating to the POIs is uploaded 213, 215 to a remote server. The information about POIs 217 and geo-fences 219 is shared with an in-vehicle system as well. The POI information is send 221 and the geo-fence information is sent 223 so that a local vehicle processor can determine if there is any coincidence between a present vehicle location and a POI.

Also, in this process, a validation and notice is received 225 when a POI is engaged in the vehicle. Notification about this notice 227 is sent to a remote server 229 for processing. The notification 231 can be sent to metrics processing 233 to see how frequently certain POI information is being used. This can help refine the POI database.

FIG. 2B shows another portion of the overall exemplary system, seen from the perspective of a mobile device and VCS. In this illustrative example, the VCS has the POI provision feature enabled 263. The system uses GPS or other coordinates 261 to compare a vehicle position 259 to geo-fences of various POIS 257. For example, without limitation, the process could receive a number of bounded areas, and if a GPS coordinate of the vehicle fell within one of these bounded areas, the process would trigger and "in geo-fence" tag 249. The geo-fence coordinates themselves can be received 255 from the remote server, which sends the coordinates 243 relating to various geo-fenced objects.

The server also sends POI information 241 relating to various points of interest along a route, in a given area, etc. When the VCS recognizes that a vehicle is within a geo-fence, denoted by the geo-fence tag, the VCS can pull the POI information 247. This information 251 is then passed along to a playback function, where the VCS can play or otherwise present the POI information 253 for the user's perusal.

The notification that a vehicle is within a geo-fence 245 can also be sent back to the monitoring server, so that general usage of various geo-fences can be tracked.

Additionally or alternatively, the tracking function may be enabled on a mobile device 281. If the mobile device is GPS equipped, the process can track the coordinates of the mobile device itself (which is either in the vehicle or in the possession of a walking person, for example). The coordinates of the device are compared 277 to the Geo-fence coordinates provided by the remote server to determine if the device is within the geo-fence 267. As with the vehicle, the mobile device receives the geo-fence coordinates 273 from the remote server and passes the coordinates 275 to the comparison function.

If the mobile device is within the geo-fence for a POI, the mobile device can pull the POI information 265 and pass the POI information 269 to a process for viewing/displaying/presenting 271 the POI information. In this manner, users can take advantage of the system while walking, and/or can use the system even if a vehicle is not equipped with all the proper technology to provide the experience on-board.

Figure 3:
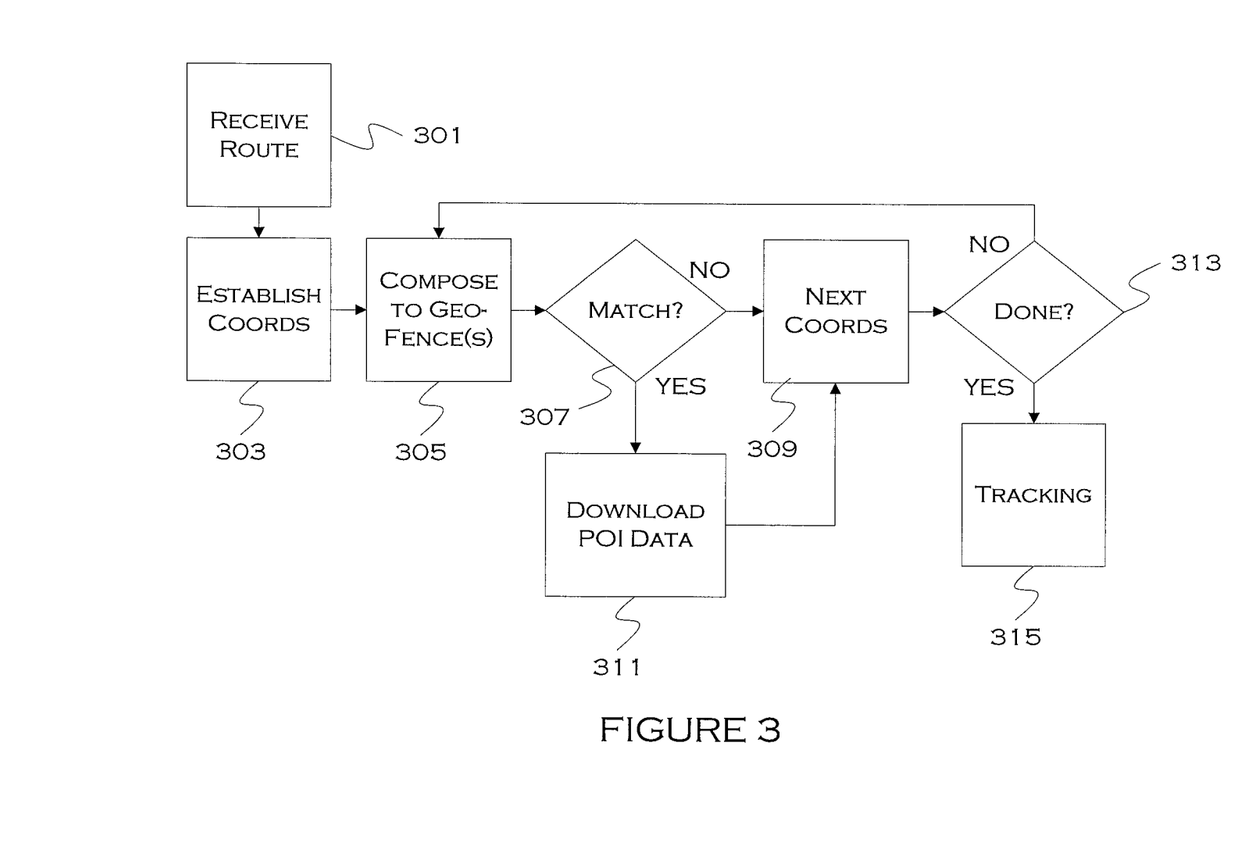
FIG. 3 shows an illustrative example of a POI pre-loading process.

FIG. 3 shows an illustrative example of a POI pre-loading process. Since many POIs along a route may be passed quickly, and may have smaller geo-fences associated with them, it may be useful to pre-load the geo-fences and/or POI information for various features projected to be along a route. Then, at least with respect to these coordinates, the process has the information needed at the time the fence is breached, so that the information can be quickly presented. Even a deviation from a route can be compensated for, as the process would then only need to pull the coordinates related to a re-route.

In this illustrative example, a remote server or an on-board or on-phone process may receive a route to be traveled 301. Based on this route, a series of coordinate locations along the route can be established 303. For each or some subset of coordinates, the process can compare the coordinates to various geo-fences known to be in the area of the coordinate 305. If there is a match (i.e., the coordinates are within the fence), the process can download POI data.

If the process is running on a remote server, the download can consist of sending the information to a local device (vehicle/phone). If the process is running on a local device, the download can consist of requesting the information from the remote server.

The process can then continue with additional coordinate points 309 until all coordinate points have been examined 313. Once all coordinate points have been examined for a projected route (which could include some standard of deviation if desired), the process can being tracking the vehicle location 315 to determine if the vehicle actually encounters a geo-fence.

Figure 4A:
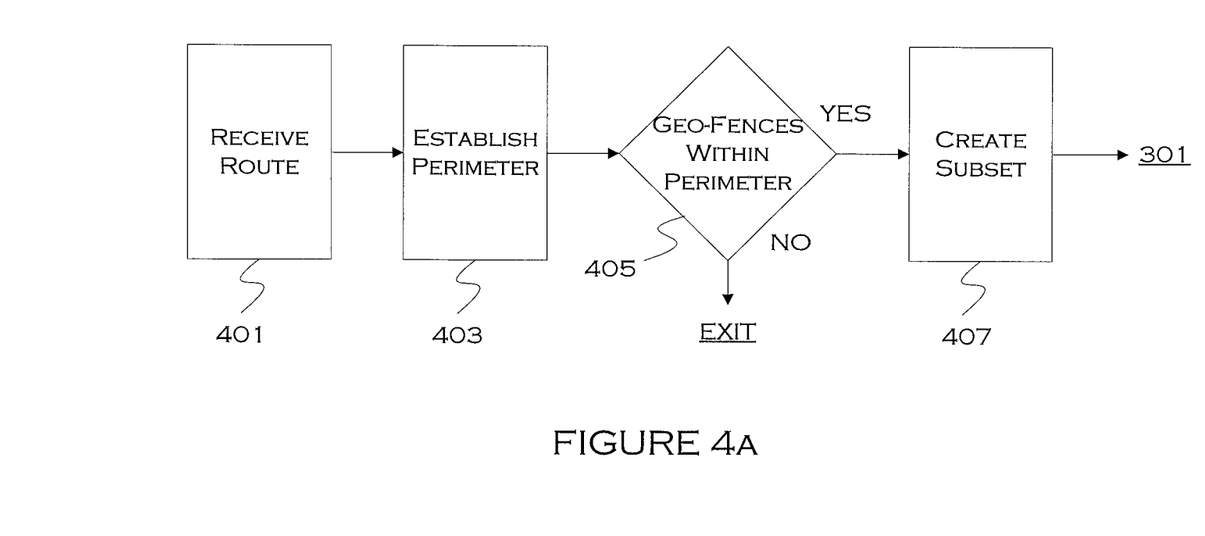
FIG. 4A shows an illustrative example of another pre-loading process.

FIG. 4A shows an illustrative example of another pre-loading process. In this illustrative example, the process receives a route 401 based on an input destination. In this example, a deviation from a route is considered, which can consist of establishing a bounded perimeter about the route 403.

The perimeter need not be uniform in deviance, but can be set according to appropriate desires. Once the perimeter has been established, various geo-fences in the region of the route can then be compared for points of coincidence 405. For each geo-fence that overlaps with the perimeter around the route, a subset can be created, which represents geo-fences that "may" come in contact with a vehicle along a trip. If this set is small enough, or if it is appropriate, this subset of POIs may be downloaded as well as those for which the route is projected to interject.

Figure 4B:
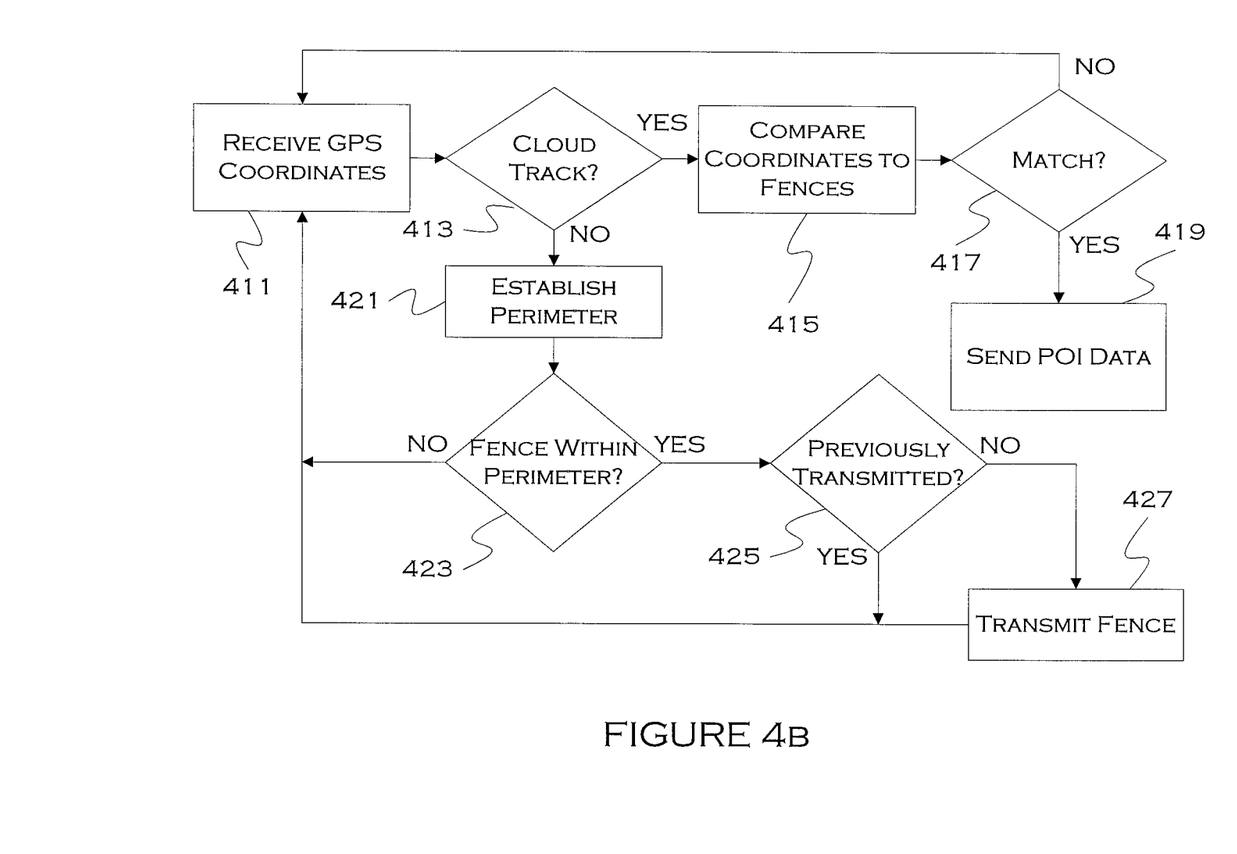
FIG. 4B shows an illustrative example of a POI recognition process.

FIG. 4B shows an illustrative example of a POI recognition process. In this process, running on a remote server, the server receives GPS coordinates of a vehicle 401. It is possible to "cloud track" the vehicle, which is, the server will determine if a POI delivery should be made. It is also possible to track the vehicle locally for comparison to the geo-fences of various POIs. In this example, some number of POIs have already been pre-sent to a vehicle.

Once the GPS coordinates are received, the process determines if cloud-tracking is enabled 403. If the vehicle will be tracked locally at the vehicle (which is to say, if the comparison will be done locally), then a perimeter can be established around the GPS coordinates for comparison purposes 411. This can help pick up geo-fences that are not exactly in the vicinity of a vehicle. Of course, larger geo-fences could also serve the same purposes. Also, in this example, since the vehicle is making the comparison, the server could provide a slightly larger (or some) perimeter, such that the projected coordinates may fall within the fence before the actual coordinates do (providing extra time for data transfer).

If a given geo-fence falls within the perimeter around the coordinates 413, the process will then check to see if information about the fence and POI have been previously transmitted 415. If this information has not been previously transmitted, the fence and POI information will be sent to the vehicle 417.

If tracking is to be done in the cloud, the process compares the current coordinates to the fences of various objects 405. If there is a match (i.e., the vehicle is proximate to an object) 407, the process can send the POI data relating to the proximate object 409.

Numerous options can be used to select appropriate geo-fences. For example, without limitation, the comparison engine could lay a circle, square or other shape on a map having geo-fences provided thereto. The shape could be centered about a coordinate point. Then, each of the geo-fences falling within the shape could be considered a possible POI that could be encountered. Other suitable considerations could also be used, including, but not limited to distance of a center of a fence, the POI or some portion of the fence from a current route.

Figure 5:
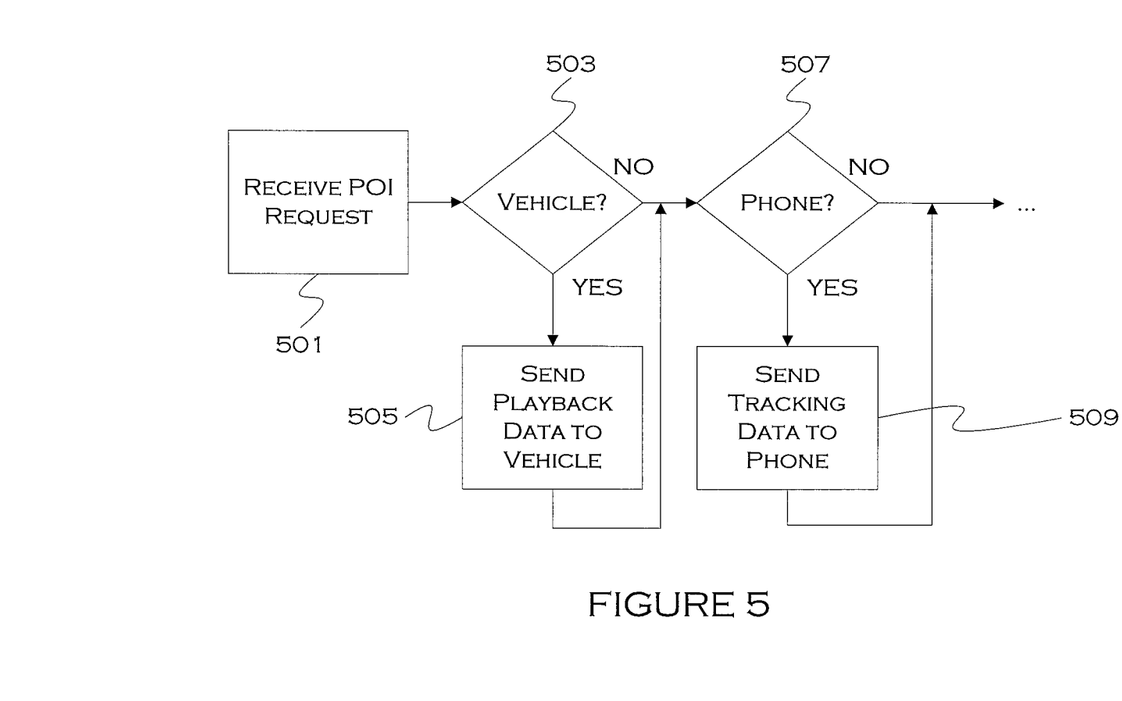
FIG. 5 shows an illustrative example of a POI playback process.

FIG. 5 shows an illustrative example of a POI playback process. In this illustrative example, the process receives a POI request for information 501. This corresponds to information about a particular POI, and can include the playback capabilities of various devices. If the request comes from a vehicle 503, the process will send the playback information to the vehicle 505. This information can be set to specifically playback on a vehicle, and may differ from mobile information.

Similarly, if the request comes from a mobile device 507, the process can send the information back to the mobile device 509. Again, the information may be uniquely suited to mobile device playback, if desired. This can continue for any additional devices which may request the POI information.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive vehicle coordinates;
compare the vehicle coordinates to geo-fence coordinate sets of a plurality of geo-fences surrounding points of interest (POI), wherein at least a portion of each geo-fence is within a predetermined distance from the vehicle coordinates;
receive information relating to the POI if the vehicle coordinates fall within the geo-fence coordinates; and
instruct presentation of the received information to vehicle occupants.

2. The system of claim 1, wherein the processor is further configured to receive a route, including a plurality of projected vehicle coordinates.

3. The system of claim 2, wherein the processor is further configured to compare one or more of the projected coordinates to one or more geo-fence coordinate sets.

4. The system of claim 3, wherein the one or more geo-fence coordinates for comparison to each projected coordinate are determined by some portion of the geo-fence for each coordinate set being within the predetermined distance from the projected coordinate.

5. The system of claim 4, wherein the processor is configured to pre-load POI information for any coincidences of projected coordinates and a geo-fence coordinate set for a given POI.

6. The system of claim 2, wherein the processor is further configured to receive one or more geo-fence coordinate sets each related to a POI, wherein a coordinate characteristic of each coordinate set is within a predetermined distance of at least one projected coordinate.

7. The system of claim 1, wherein the POI includes a temporal characteristic, and wherein the processor is further configured to compare a current time or date to the temporal characteristic and instruct presentation only if the current time or date is before an end point of the temporal characteristic.

8. A computer-implemented method comprising:
receiving vehicle coordinates;
comparing the vehicle coordinates, via a computing system, to geo-fence coordinate sets of a plurality of geo-fences surrounding points of interest (POI), wherein at least a portion of each geo-fence is within a predetermined distance from the vehicle coordinates;
receiving information relating to the POI if the vehicle coordinates fall within the geo-fence coordinates; and
instructing presentation of the received information to vehicle occupants.

9. The method of claim 8, further comprising receiving a route, including a plurality of projected vehicle coordinates.

10. The method of claim 9, further comprising comparing one or more of the projected coordinates to one or more geo-fence coordinate sets.

11. The method of claim 10, wherein the one or more geo-fence coordinates for comparison to each projected coordinate are determined by some portion of the geo-fence for each coordinate set being within the predetermined distance from the projected coordinate.

12. The method of claim 11, further comprising pre-loading POI information for any coincidences of projected coordinates and a geo-fence coordinate set for a given POI.

13. The method of claim 9, further comprising receiving one or more geo-fence coordinate sets each related to a POI, wherein a coordinate characteristic of each coordinate set is within a predetermined distance of at least one projected coordinate.

14. The method of claim 9, wherein the POI includes a temporal characteristic, and wherein the comparing further includes comparing a current time or date to the temporal characteristic and the instructing further includes instructing presentation only if the current time or date is before an end point of the temporal characteristic.

15. A non-transitory, computer readable storage medium, storing instructions that, when executed by a processor, cause the processor to perform a method comprising:
receiving vehicle coordinates;
comparing the vehicle coordinates, via a computing system, to geo-fence coordinate sets of a plurality of geo-fences surrounding points of interest (POI), wherein at least a portion of each geo-fence is within a predetermined distance from the vehicle coordinates;
receiving information relating to the POI if the vehicle coordinates fall within the geo-fence coordinates; and
instructing presentation of the received information to vehicle occupants.

16. The storage medium of claim 15, further comprising receiving a route, including a plurality of projected vehicle coordinates.

17. The storage medium of claim 16, further comprising comparing one or more of the projected coordinates to one or more geo-fence coordinate sets.

18. The storage medium of claim 17, wherein the one or more geo-fence coordinates for comparison to each projected coordinate are determined by some portion of the geo-fence for each coordinate set being within the predetermined distance from the projected coordinate.

19. The storage medium of claim 18, further comprising pre-loading POI information for any coincidences of projected coordinates and a geo-fence coordinate set for a given POI.

20. The storage medium of claim 15, further comprising receiving one or more geo-fence coordinate sets each related to a POI, wherein a coordinate characteristic of each coordinate set is within a predetermined distance of at least one projected coordinate.

* * * * *